Jan. 30, 1962  A. E. GILSTRAP  3,018,926
SEED DISPENSER
Filed July 8, 1959
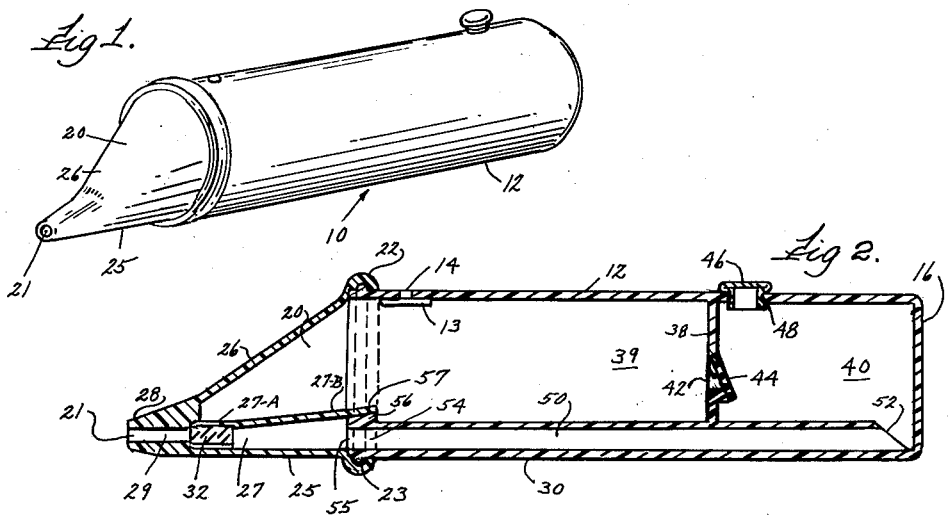
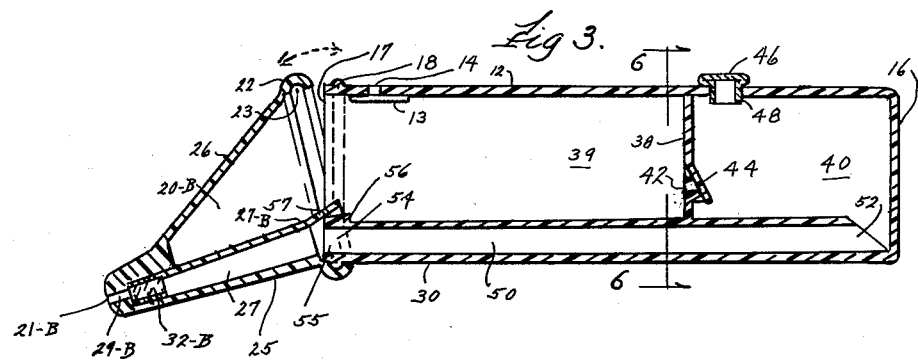
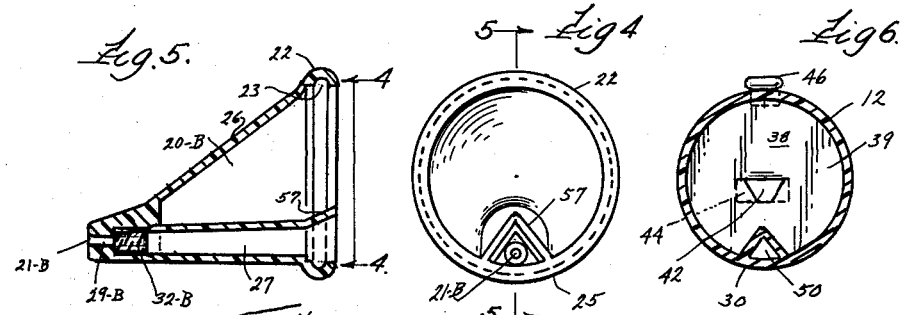
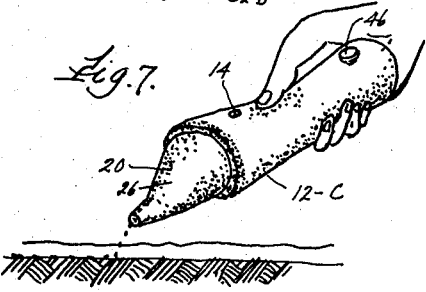
INVENTOR.
Aretta E. Gilstrap
BY
Joseph B. Lindecker
ATT'Y.

United States Patent Office 3,018,926
Patented Jan. 30, 1962

1

3,018,926
SEED DISPENSER
Aretta E. Gilstrap, Rte. 1, Prosser, Wash.
Filed July 8, 1959, Ser. No. 825,727
5 Claims. (Cl. 222—193)

This invention relates to gardening equipment, and, more particularly, to a device for dispensing non-liquid seeds.

It is an object of the present invention to provide a manually operated seed dispenser for gardens and small farms that will facilitate the planting of dry seeds of various sizes in straight rows in properly spaced relationship.

Another object of the present invention is to provide a seed dispenser of the above type that will automatically control the flow of seeds passing outwardly therethrough so as to prevent large numbers of seeds from falling into too small an area and which can be used to properly distribute such seed in a simple and efficient manner.

Still another object of the present invention is to provide a pneumatic type seed dispenser adapted to employ one of a plurality of different size nozzles, the opening in the end of the nozzle to accommodate the size seed which is desired to be planted, a gentle squeeze of the flexible plastic body portion of the dispenser will force air from a compression chamber therein and effect seeds to pass out the nozzle in a manner that the outside air currents will not blow the seeds to an undesirable place.

Other objects of the invention are to provide a seed dispenser bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a perspective view of a seed dispenser made in accordance with the present invention;

FIGURE 2 is an enlarged longitudinal cross sectional view of the seed dispenser shown in FIGURE 1;

FIGURE 3 is an enlarged longitudinal cross sectional view of the dispenser shown in FIGURES 1 and 2, except a different nozzle is partially applied thereto with a smaller size nozzle opening;

FIGURE 4 is a vertical elevational view looking in the direction of arrows 4—4 of FIGURE 5;

FIGURE 5 is a longitudinal sectional view taken on lines 5—5 of FIGURE 4;

FIGURE 6 is a vertical sectional view taken on line 6—6 of FIGURE 3; and

FIGURE 7 is a perspective view of the dispenser shown by FIGURE 1 and in operative use.

Referring now more in detail to the drawing, a seed dispenser 10 made in accordance with the present invention is shown to include a resilient, molded plastic, main body section 12 of cylindrical configuration that is compressible in response to a very gentle squeeze or pressure thereon, but which will automatically return to its normal cylindrical shape in response to the removal of such squeezing pressure therefrom. When the pressure is relieved, the body portion will return to its normal molded shape, and the return of the air space to its normal size will result in a tendency to form a vacuum within the air space. As a result, atmospheric pressure outside the dispenser will cause the flap-valve 13 to open, said flap-valve bearing normally against the underside of the top wall portion of the cylindrical body portion and closing an air vent 14 formed in the upper surface of the main body section 12 and adjacent the forward end thereof. Said flap-valve can be formed from molded material, such as rubber or plastic, or may be formed from a thin strip of spring metal; it can be cemented or otherwise fixedly attached to the body section 12. It is mainly important that the flap-valve be capable of being manufactured at a minimum of cost, and that it be adapted to normally swing to a vent-closing position. A vertical end wall 16 closes the rear end of the main body portion, while the opposite end thereof is provided with a cylindrical open end 17 and a peripheral bead 18 formed upon the exterior end portion thereof to form a nozzle attaching means. The open end of the body section 12 is cylindrical to receive a nozzle 20 having a horizontal bottom wall portion and a downwardly inclined top wall portion and an outlet opening 21 at the small end thereof. A plurality of similar nozzles are provided with different size outlet openings 21 for accommodating seeds of various sizes, all of such nozzles being interchangeably mountable upon the open end of said main body portion 12. The nozzle 20 is formed with an enlarged exterior collar 22 adjacent its open end and with an annular recess 23 on its interior, the open ends of said nozzle 20 and said body portion 12 being substantially the same size whereby the interior of said collar 22 can slip over the exterior of said end portion 17, the recess 23 in said collar 22 snapping over said peripheral bead 18 on said end portion 17 forming means to removably secure the cone 20 to the body portion 12 without rotation thereof. The cone 20 has a straight horizontal lower side portion 25 and a downwardly inclined top side portion 26, the lower side portion 25 being in exact horizontal alignment with the lower cylindrical side portion 30 of said body portion 12. The small end 28 of said nozzle 20 is formed of non-compressible plastic with a cylindrical bore 29 therein. An inverted V-shaped channel 27 is integrally formed adjacent the lower side of the cone 20 to form a seed transportation passageway; said channel 27 is smaller in cross-section at its forward end 27–A than at its rear end 27–B, the forward end 27–A joining said cylindrical bore 29 to form an air-tight junction thereof. A plurality of bristles 32 of any desired construction extend into the path of flow of the seeds through the channel 27 adjacent the outlet end of the channel 27 in the vicinity of the entrance to the inlet end of bore 29 of the nozzle 20. The bristles 32 tend to separate the seeds and prevent large clusters of seeds from leaving the channel at any one time; the seeds flow in a procession one after the other which is most desired.

Within the main body member 12, a partition wall 38 divides the interior thereof into a compression chamber 39 and a seed chamber 40 with the compression chamber intermediate the open end 17 and the seed chamber 40; the nozzle and/or cone 20 closing the open end 17 thereof when assembled therewith. A port 42 in the partition wall 38 admits air under pressure from compression chamber 39 into the seed chamber 40 under the control of a flexible flap-valve 44 that functions as a one way flap-valve to permit air to pass inwardly into the seed chamber 40 but preventing the passage of air outwardly therethrough. A removable closure 46 normally closes the inlet 48 to the interior of the seed chamber into which the seed is inserted; said inlet 48 usually in the upper wall of the seed chamber 40. An integral inverted V-shaped channel 50 extends entirely through the main body portion 12 from within the seed chamber 40. This channel 50 has an inlet 52 within the seed chamber, at the bottom thereof, and an outlet 54 at its opposite end 55, said opposite end 55 having an enlarged external ridge 56 with exterior tapered wall which extends into and is secured air-tight into the tapered inlet portion 57 on the rear end 27–B of channel 27. The channels 27 and 50 form one continuous seed passageway extending from the seed chamber 40 to the cylindrical bore 29 forming the outlet opening 21.

As shown by FIGURE 3 of the drawings, a nozzle 20-B is partially removed from the open end of the body member 12. The nozzle 20-A has a smaller outlet 21-B than outlet 21 of nozzle 20. The smaller outlet 21-B in nozzle 20-B is very desirable for use with seed of small size even though the bristles 32-B control the travel thereof.

In actual use, the seed dispenser is taken in hand and the seeds inserted through inlet 48 into the seed chamber 40. The proper size nozzle 20 is then applied to the open end of the main body section 12 to properly feed the seeds in a continuous manner from the seed chamber 40. With the chamber 22 filled with a desired quantity of selected seeds, the main body member 12 is manually compressed to the deformed condition 12-C illustrated in FIGURE 4, so that air compressed therewithin is forced rearwardly through the port 42 past the flap-valve 44 into the seed chamber 40. This compressed air entrains a plurality of seeds and carries them forwardly through the channels 50 and 27 toward the bristles 32 and the outlet 21 of the nozzle 20, from which they are dispensed one after another onto the ground as desired. Upon releasing the compressed main body member 12 as shown by 12-C in FIGURE 4, it will return to its original shape, during which return movement fresh air is drawn inwardly through the air vent 14 past the flap-valve 13 to provide a new supply of air for the next compressive action. This same procedure is performed when a smaller cone 20-B is applied to the main body portion of the dispenser.

By providing a plastic seed dispenser with integral parts and two flap-valves, the only air entering the compression chamber 39 is obtained through inlet 14 controlled by the flap-valves 13. Due to the large size of the inlet 14 and port 42 and due to the seeds being arranged in the channels 27 and 50, substantially no air can return to the seed chamber 40 from outlet 21; most of the air within the seed chamber 40 must come from the compression chamber 39 through port 42 controlled by flap-valve 44.

When the main body portion is compressed manually by the user, the nozzle 20 and rear end portion adjacent rear wall 16 are not distorted to any extent.

While various changes may be made in the detail construction, it shall be understood that such changes shall be allowed as come within the spirit and scope of the present invention.

I claim as my invention:

1. A manually compressible dry seed dispenser comprising, in combination, a cup-shaped horizontal main body member embodying a horizontal cylindrical side wall of a uniform internal diameter and closed by a vertical wall at the rear end thereof and open at the opposite end, a peripheral locking means having a convex surface formed upon the exterior of the end wall portion of the open end portion of said body member, said body member having a top concave wall portion, a bottom concave wall portion and integral concave side wall portions, a substantially hollow funnel shaped removable discharge nozzle of right triangular cross-section, said nozzle having one small circular discharge end and one large circular inlet end and an opening in each of said ends, said opening in the small end of said nozzle formed by a cylindrical bore therein and effecting the discharge outlet, the opening in the large end of said nozzle being circular and effecting the annular inlet thereof, said annular inlet being of the same diameter as the uniform internal diameter of said main body member and embodying an annular concave recess in its terminal peripheral end portion for receiving the convex surface of the peripheral locking means on the open end portion of said main body member, said nozzle having a horizontal bottom wall portion and a concave downwardly inclined top wall portion forming a hollow chamber therein, said nozzle being interchangeably secured upon the open end of said main body member with its bottom wall portion in alignment with the bottom wall portion as said main body member, a vertical transverse partition wall within said main body member dividing the interior thereof into a horizontal compression chamber of cylindrical configuration with a compressible concave upper portion adjacent the open end thereof and a dry seed storage chamber of cylindrical configuration adjacent the closed end thereof, thereby arranging said compression chamber intermediate said discharge nozzle and said dry seed chamber, the open end of said nozzle joining the open end of said compression chamber whereby said hollow chambers of said nozzle and said hollow compression chamber of said body member become one closed chamber with a cylindrical rear end portion and a cone shaped forward end portion, a port in said vertical transverse partition wall communicating with said compression chamber and said dry seed storage chamber, a flap-valve assembled upon the storage chamber side of said vertical transverse wall for controlling passage of air rearwardly from said compression chamber into said dry seed storage chamber, an air inlet in the upper concave horizontal wall portion of said compression chamber and a flap-valve assembled upon the under side of said upper concave horizontal wall to permit air to enter the air compression chamber from the atmosphere following deformation of the upper concave horizontal wall portion of said compression chamber and to normally close said inlet, and a horizontal channel means in said horizontal main body member and in contact with the bottom wall portion thereof joining a horizontal channel means in contact with the bottom wall portion of said nozzle for supplying dry seeds to said nozzle outlet pneumatically in response to a pressure within said compression chamber by squeezing the exterior horizontal top wall portion of the compression chamber of said horizontal main body member manually by the user.

2. The combination according to claim 1, wherein said main body member is constructed of thin compressible plastic material and responsive to an external squeezing pressure upon the upper wall portion of said compression chamber thereof to compress the air in said compression chamber to pressurize said seed chamber through said port in said transverse partition wall.

3. The combination according to claim 2, wherein said channels in said nozzle and said body member are dry seed transportation channels, the said channel in said body member being substantially triangular, the said channel in said nozzle being triangular and having an outwardly tapered end portion, the forward end of said body member channel telescoping with said outwardly tapered rear end of said nozzle channel and when assembled together they are in air-tight relationship with each other.

4. The combination according to claim 3, wherein said nozzle has a downwardly tapered top wall portion extending from adjacent the top wall portion of said main body member when assembled therewith to its said discharge outlet, said nozzle being interchangeable with said main body member to accommodate nozzles with smaller size outlets therein.

5. A dry seed dispenser comprising two members having the forward end portion of one member detachably connected within the rear end portion of the other member, one member being a cup shaped body member with cylindrical flexible concave interior side walls and closed at its rear end by a vertical wall, its opposite end being open as defined by said side walls, said side walls of said body member being flexible when pressed and adapted by their inherent resiliency to return to their normal original position when pressure is released, the other member being a substantially cone shaped hollow nozzle of right triangular cross-section, a transverse vertical wall arranged within said body member providing a cylindrical compression chamber and a dry seed chamber, said cylindrical compression chamber arranged between said nozzle and said dry seed chamber, the interior of said hollow nozzle forming a hollow chamber and which joins said cylindrical compression chamber of said body member effecting a joint compression chamber with a cylindrical closed rear end portion and a cone shaped forward end portion, a suitable air valve in the wall of said compression chamber, a suitable air valve in said transverse vertical wall, a channel within and arranged along the bottom of said body member, a channel within and arranged along the bottom of said nozzle, the adjacent ends of said channels connected together whereby seeds from said dry seed chamber are pneumatically conveyed to the outlet opening in the forward end of said nozzle when said cylindrical wall of said compression chamber is pressed by the user.

References Cited in the file of this patent

UNITED STATES PATENTS

| | | |
|---|---|---|
| 2,105,957 | Severson | Jan. 18, 1938 |
| 2,139,158 | Glover | Dec. 6, 1938 |
| 2,761,833 | Ward | Sept. 4, 1956 |
| 2,854,175 | Spitzmesser | Sept. 30, 1958 |
| 2,886,218 | Marcus | May 12, 1959 |